(No Model.)

J. BISHOP.
SPRINKLER HEAD.

No. 591,266. Patented Oct. 5, 1897.

Witnesses.
J. H. Shumway
Lillian D. Kelsey

Joseph Bishop
Inventor
By Attys.
Earle Seymour

UNITED STATES PATENT OFFICE.

JOSEPH BISHOP, OF MERIDEN, CONNECTICUT, ASSIGNOR OF ONE-HALF TO JOHN TAIT, OF SAME PLACE.

SPRINKLER-HEAD.

SPECIFICATION forming part of Letters Patent No. 591,266, dated October 5, 1897.

Application filed June 29, 1896. Serial No. 597,344. (No model.)

*To all whom it may concern:*

Be it known that I, JOSEPH BISHOP, of Meriden, in the county of New Haven and State of Connecticut, have invented a new Improvement in Sprinkler-Heads; and I do hereby declare the following, when taken in connection with the accompanying drawings and the letters of reference marked thereon, to be a full, clear, and exact description of the same, and which said drawings constitute part of this specification, and represent, in—

Figure 1:
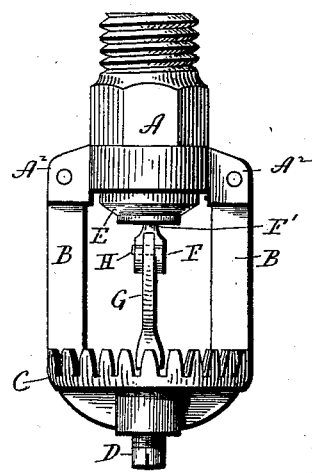
Figure 2:
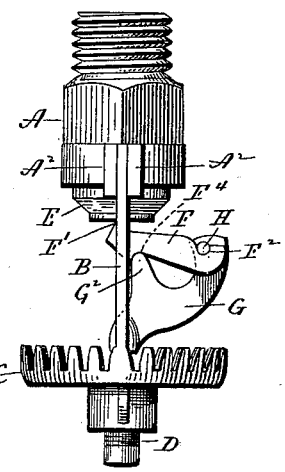
Figure 3:
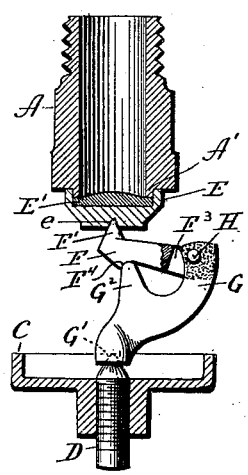
Figure 4:
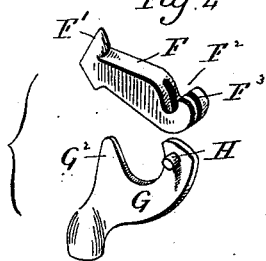
Figure 5:

Figure 1, a view in side elevation of one form which a sprinkler-head constructed in accordance with my invention may assume; Fig. 2, an edge view thereof; Fig. 3, a view thereof in vertical central section; Fig. 4, a detached perspective view of the compound lever, the members of which are separated; Fig. 5, a detached perspective view of the valve and its rock-crystal seat.

My invention relates to an improvement in sprinkler-heads for use in conjunction with automatic fire-extinguishing apparatus, the object being to produce a simple, compact, and reliable head, composed of few parts and constructed with particular reference to certainty of operation when the element of fusible metal is melted or softened by a dangerous temperature.

With these ends in view my invention consists in certain details of construction and combinations of parts, as will be hereinafter described, and pointed out in the claim.

As shown in Figs. 1 to 5, inclusive, of the drawings, my improved head consists of a threaded body portion or nipple A, which adapts it to be applied to a pipe or member of the water-supply system, and which is constructed with a depending annular valve-seat A' and with two oppositely-located downwardly-extending arms $A^2$ $A^2$, which are provided for the attachment of the parallel vertical arms B B; supporting the spreader C, which is furnished with an adjustable screw D, located in line with the center of the valve-seat A', before mentioned. The valve E, which is cup-shaped, fits over the valve-seat A' and receives the impact of the water in the pipes, which constantly tends to force it downward away from the seat. It is furnished with a lining E' of non-corrosive material—such, for instance, as rock-crystal or some other natural formation which does not corrode under the action of water. A non-corrosive lining is very desirable for the certain action of the sprinkler-head, which, as it often goes for a very long period without being tested, will otherwise be liable to become fouled, so as to stick the valve to its seat so tightly as to resist the force of the water to blow it off at the time of action. I do not limit myself to the use of rock-crystal for a lining; but that material will be found to be very effective.

The valve is held up against its seat by means of a two-part compound lever, composed of the lever F and the lever G. The former I shall call the "valve-lever," as it coacts directly with the valve, and the latter the "screw-lever," as it coacts directly with the screw. The inner end of the valve-lever which is horizontally arranged, is formed with a point F', which enters a slight depression $e$, formed in the center of the lower face of the valve. The outer end of the said lever is constructed with a transverse notch $F^2$ for the reception of the fusible pin H, and with a longitudinal notch $F^3$ for the reception of the upper end of the screw-lever G, the said upper end of which carries the said pin and the lower end of which contains a slight conical depression G', to receive the conical upper end of the screw D. The screw-lever is also furnished with an upwardly-extending tooth $G^2$, which takes into a notch or depression $F^4$, formed in the under face of the inner end of the lever F. These two levers normally hold the valve upon its seat against the water-pressure, the main thrust of which is taken by the tooth $G^2$ of the screw-lever, but sufficient strain is imposed upon the fusible pin to cause the same to be sheared off, if it be so much as softened by the raising of the temperature to a point near to which it melts. This pin being located for a considerable distance to one side of the line of pressure has comparatively little strain placed upon it, and for that reason a small and very sensitive pin may be used. Having spoken of the "line of pressure," I may explain that that line is a vertical line drawn through the center of the valve and through the longitudinal center of the screw D. It is to be particularly noted that the teeth $G^2$ of the screw-lever and the notch or depression $F^4$ in the valve-lever are both located well outside of the line of pressure, whereby the device is made much more sensitive than if the two levers were engaged with each other in the line of pressure or substantially therein.

I particularly wish to point out that in the construction shown in the drawings the valve-lever and screw-lever are constructed and arranged so that their fusible connection lies in a plane between the horizontal planes of the valve and spreader. Under this construction the delicate fusible connection is to a large extent protected against external injury, particularly by the spreader and by the parallel vertical arms which support the same. It is to be noted also that in both the preferred and modified constructions shown and described the valve-lever and screw-lever are formed independently of the parts constituting the frame of the device.

To increase the sensitiveness of the head and also to protect the pin from fouling, I may, if I please, coat it with a quick-burning composition, which I have represented in Fig. 2 of the drawings by stippling K. This composition may be of any chemical character adapted to ignite at a dangerous temperature and producing a local application of heat to the pin. I do not limit myself, however, to using such composition, that being optional.

In view of the modified form shown by Fig. 6 and of other modifications which have been suggested I would have it understood that I do not limit myself to the exact form described, but hold myself at liberty to make such departures therefrom as fairly fall within the spirit and scope of my invention.

I am aware, however, that a sprinkler-head having two levers located between its valve and adjusting-screw and held together at their outer ends by a fusible bond is old, and also that it is old to employ fusible pins in sprinkler-heads for the purpose of normally keeping the same closed. I do not claim, therefore, either of those constructions broadly.

Having fully described my invention, what I claim as new, and desire to secure by Letters Patent, is—

In a sprinkler-head, the combination with the valve and the adjusting-screw thereof, of an independently-formed, horizontally-arranged valve-lever, having its inner end engaged with the valve, and its outer end constructed with a transverse notch extending across its upper face and with a longitudinal slot intersecting the said notch, an independently-formed screw-lever having its lower end engaged with the screw, and its upper end adapted to enter the longitudinal slot in the valve-lever, and a fusible pin mounted transversely in the upper end of the screw-lever, and entering the transverse notch of the valve-lever which is engaged at a point near its inner end by the screw-lever, whereby the two levers are engaged at a point near to but outside of the line of pressure which is the line joining the centers of the valve and the screw.

In testimony whereof I have signed this specification in the presence of two subscribing witnesses.

JOSEPH BISHOP.

Witnesses:
WILBUR F. DAVIS,
WILLIAM C. MUELLER.